United States Patent [19]

Helms

[11] 4,350,366
[45] Sep. 21, 1982

[54] MANUALLY PROPELLED LAWN AND GARDEN CART

[76] Inventor: Harold R. Helms, 965 Rile St., Bushnell, Ill. 61422

[21] Appl. No.: 207,352

[22] Filed: Nov. 17, 1980

[51] Int. Cl.³ .............................................. B26B 1/04
[52] U.S. Cl. ................................ 280/655; 280/47.26; 280/47.33; 280/47.35
[58] Field of Search .................. 280/38, 40, 645, 651, 280/652, 654, 655, DIG. 6, 47.34, 47.35, 47.26, 47.33, 47.37 R, 79.1 A

[56] References Cited

U.S. PATENT DOCUMENTS

| D. 115,352 | 6/1939 | Scudder | 280/47.35 |
|---|---|---|---|
| 2,865,647 | 12/1958 | Wilson | 280/47.35 |
| 3,210,091 | 10/1965 | Ng | 280/47.35 |
| 3,435,956 | 4/1969 | Ulitsch | 211/60 |
| 3,489,426 | 1/1970 | Bond | 280/40 |
| 3,759,538 | 9/1973 | Fabiano | 280/47.35 |
| 3,894,748 | 7/1975 | Ratcliff | 280/41 |

Primary Examiner—David M. Mitchell
Assistant Examiner—Kenneth R. Rice
Attorney, Agent, or Firm—Wm. T. Metz

[57] ABSTRACT

A manually propelled lawn and garden cart comprised of a bottom storage box and an open frame securely fastened to the top of the bottom storage box, means to support lawn and garden tools in the open frame and the bottom storage box, preferably by tubes fastened between holes in a cross piece at the top of the open frame, and a similar cross piece which is the top of the bottom storage box. Wings are pivotably attached between extensions to the bottom storage box and the open frame. The wings have brackets attached to them which receive a trash bag bracket pivotably attached to the open frame near its top so as to hold the lawn and garden cart in a stable position. An adjustable leg is attached to the bottom of each wing which may be adjusted so as to touch the ground when the lawn and garden cart is placed in a horizontal position so that the adjustable legs, together with wheels attached to the bottom storage box, form a 4 point support. A back box attached to the open frame has side brackets attached to it to receive pivots attached to a handle. The lawn and garden cart may be stored in a very small space in an upright position by closing the wings, adjusting the adjustable legs and placing the handle in an upright position.

3 Claims, 7 Drawing Figures

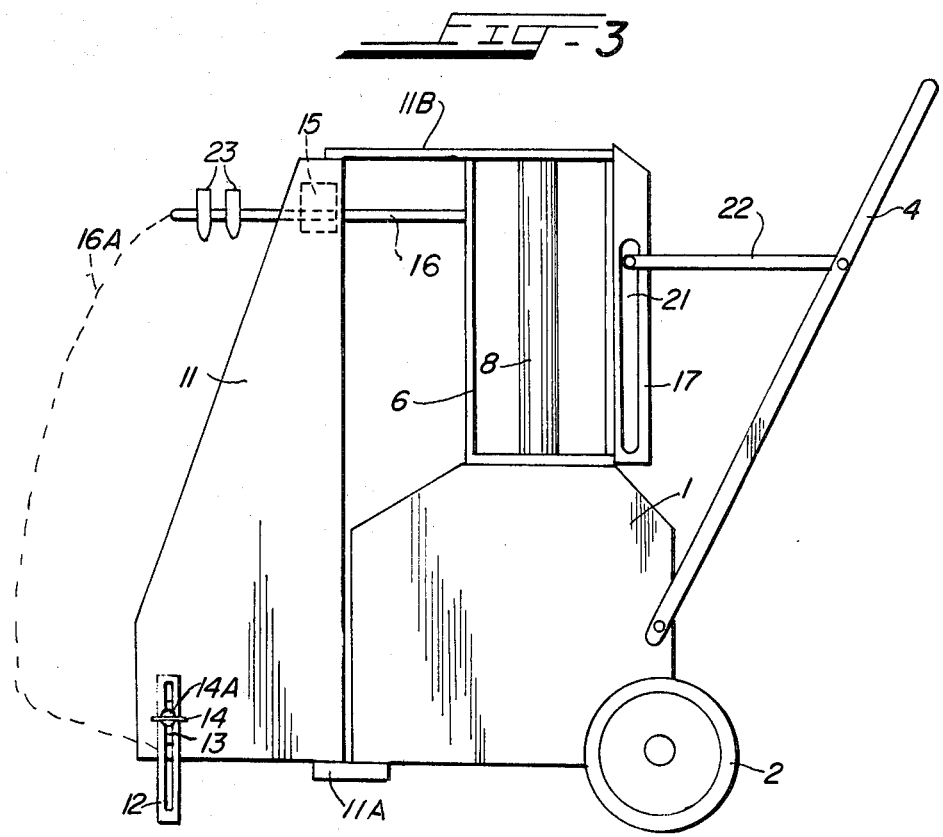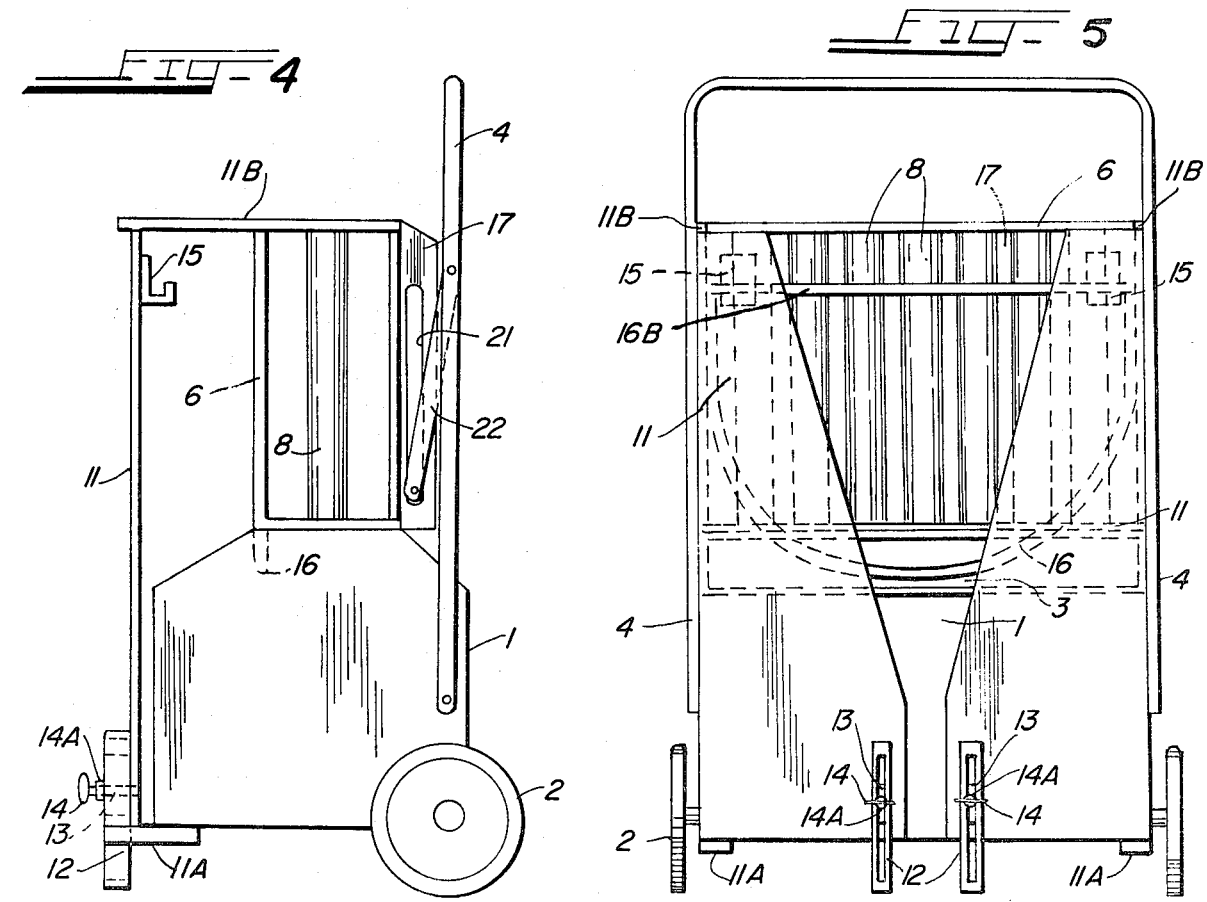

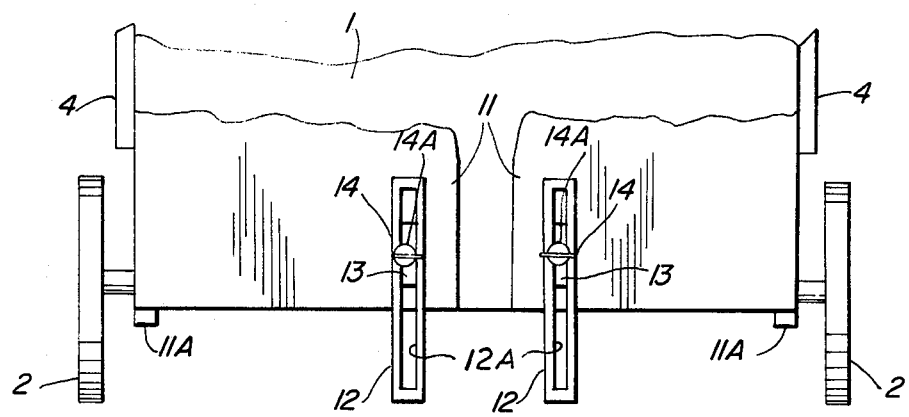
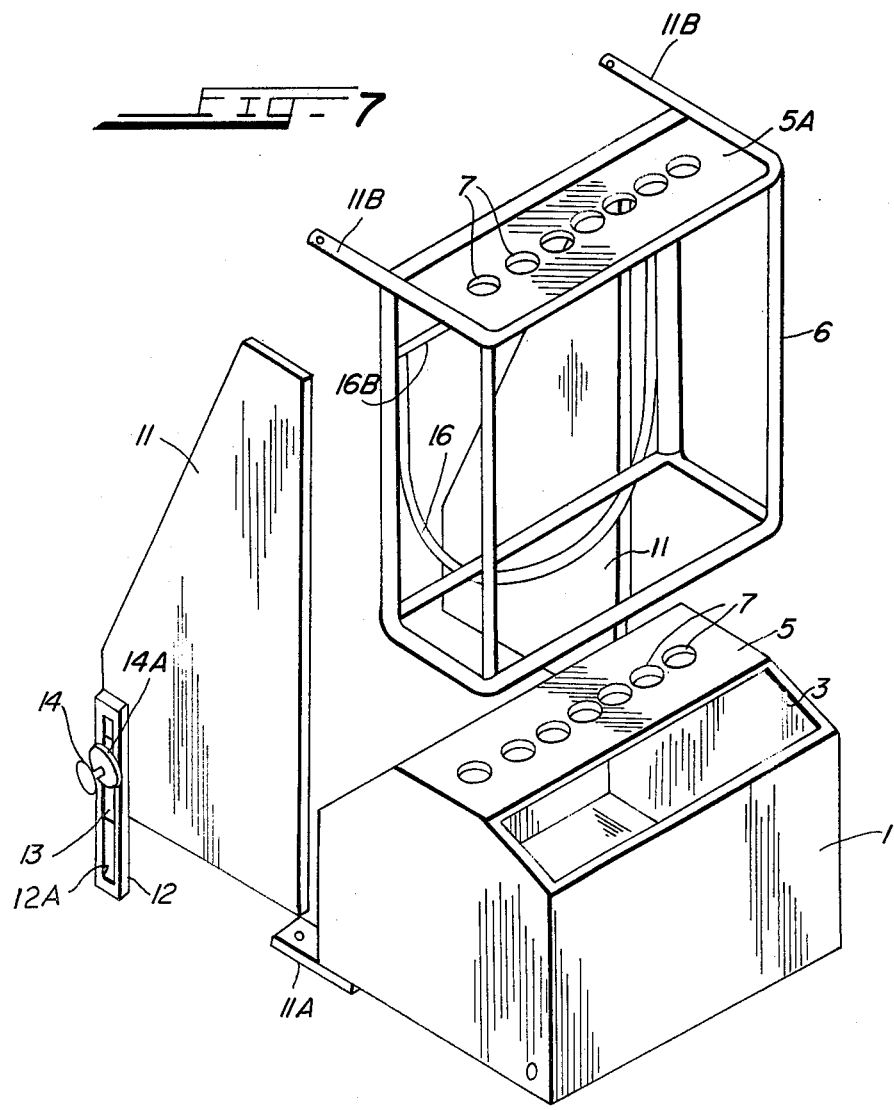

MANUALLY PROPELLED LAWN AND GARDEN CART

BACKGROUND OF THE INVENTION

1. Field of the Invention

This invention pertains to lawn and garden carts and more particularly to a lawn and garden cart that is manually propelled for use in hauling and storing long handled lawn and garden tools, such as leaf rakes, garden rakes, hoes, straight brooms, deck brooms, pitchforks and long handled shovels. The lawn and garden cart will also store hand and short handled tools, such as pruning shears, hand trowels and hand cultivators and, further, will store work gloves, seeds, fertilizer and other items used in and around the lawn and garden, as well as trash that is picked up around the lawn and garden.

BACKGROUND OF THE INVENTION

2. Description of the Prior Art

Heretofore lawn and garden carts have been of a variety that will convey tools but have not been foldable into a small package so that the tools may be stored in the garage when not in use. Further, previous lawn and garden carts have not been adapted to have multiple usage, such as shown in the instant invention.

The following United States patents are in the opinion of the inventor and upon advice of counsel the closest prior art of which the inventor is aware.
Scudder: Des. No. 115,352
Wilison: No. 2,865,647
Ulitsch: No. 3,435,956
Fabiano: No. 3,759,538
Ratcliff: No. 3,894,748

As can be seen by reference to the prior art disclosed above none of the prior art discloses a lawn and garden cart which will serve all of the purposes set out above. Ratcliff shows a lawn and garden cart that is foldable but does not show the means for storing seeds and small objects as shown in the instant application, nor does it show the foldability feature for storage of the garden tools as well as the cart.

SUMMARY OF THE INVENTION

It is, therefore, an object of this invention to provide a lawn and garden cart which will hold long handled tools, short handled tools, work gloves, seeds and fertilizer and has a bracket for holding trash bags.

It is a further object of this invention to provide a lawn and garden cart that is free standing at all times, either in use or in storage.

It is a further object of this invention to provide a lawn and garden cart which will support a trash bag to carry heavy trash.

It is a further object of this invention to provide a lawn and garden cart that has tubes for holding handles, thus separating the handles.

BRIEF DESCRIPTION OF THE DRAWING

FIG. 3 is a side view of the lawn and garden cart with the handle extended in a down position and the wings open to receive the trash bag, showing the cart as it would be used.

FIG. 4 is a side view of the lawn and garden cart in a folded position, showing the cart as it would be stored.

FIG. 5 is a front view of the lawn and garden cart with the wings closed.

FIG. 6 is an enlarged view of the lower portion of the lawn and garden cart, showing the adjustable legs.

FIG. 7 is an exploded view of the wings, frame and bottom storage box.

DESCRIPTION OF THE PREFERRED EMBODIMENT

Figure 1:
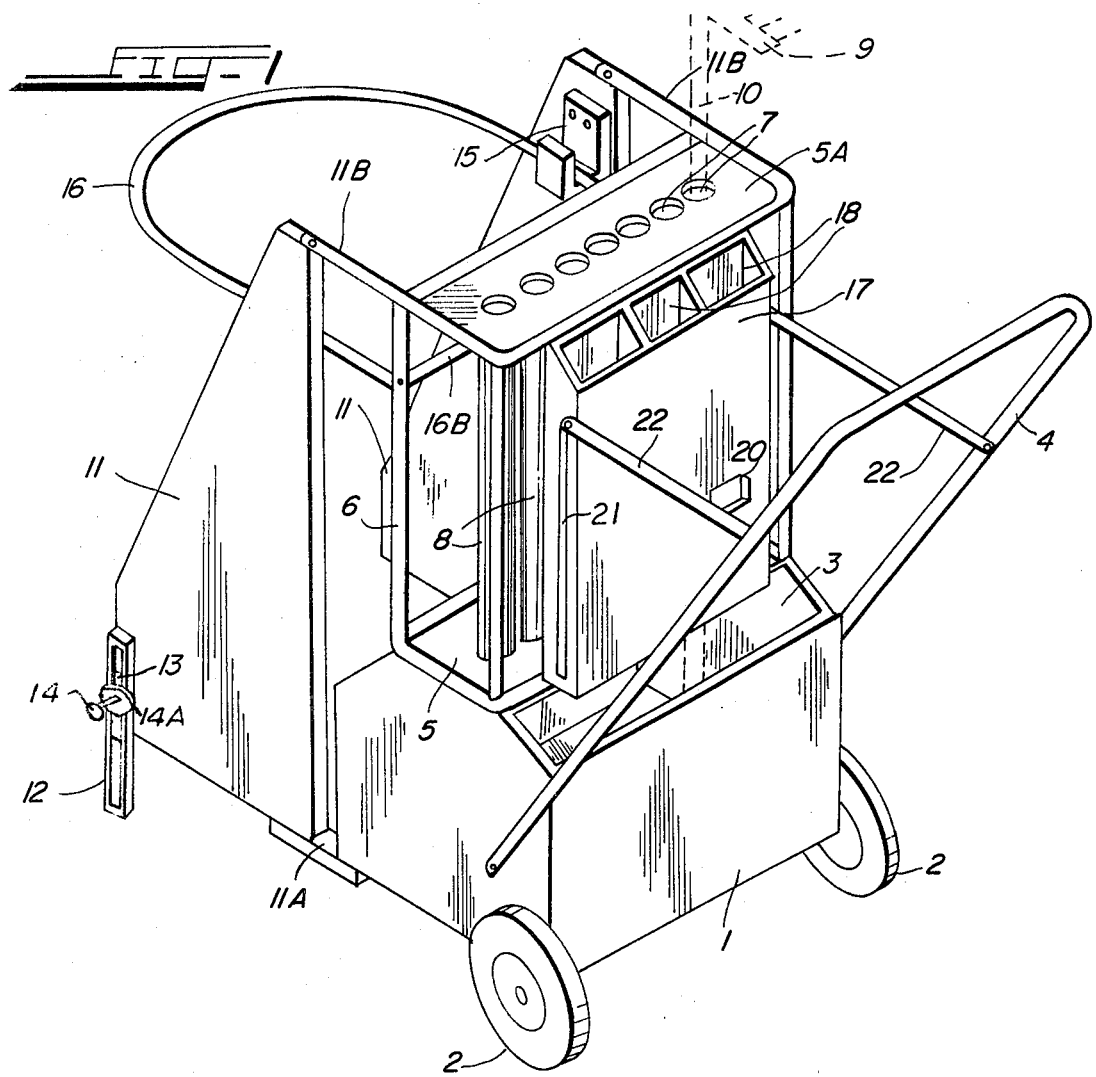
FIG. 1 is a perspective view of the lawn and garden cart showing the features of the instant invention.
Figure 2:
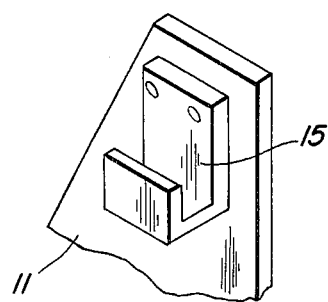
FIG. 2 is a perspective view of the top of the wing and the bracket which receives the trash bag bracket.

The lawn and garden cart has a bottom storage box 1 to which are attached wheels 2. There are oblique openings 3 on either side near the top of the bottom storage box 1. A handle 4 is pivotably attached to the bottom storage box 1 near the wheels 2. An open frame 6 is securely fastened by means not shown to the top 5 of the bottom storage box 1. A cross piece 5A is attached to the top of the open frame 6. Holes 7 in the cross piece 5A and in the top 5 of the bottom storage box 1 receives tubes 8 which allow storage of garden tools 9 by placing their handles 10 through the tubes 8 so that the handles rest on the bottom of the bottom storage box 1. Wings 11 are pivotably attached between extensions 11A of the bottom storage box 1 and extensions 11B of the frame 6. Adjustable legs 12 are slideably attached to the outside bottom portion of wings 11. The openings 12A in the adjustable legs 12 allow the adjustable legs 12 to slide on blocks 13 attached to the bottom of the wings 11. Wing nuts 14 and washers 14A serve to hold the adjustable legs 12 in the proper position. Brackets 15 attached to the top of wings 11 receive the trash bag bracket 16 when the wings 11 are in an open position and trash bag bracket 16 is moved to a horizontal position. Trash bag bracket 16 is pivotably attached to the top of the open frame 6 and pivots into a folded position, as shown in FIGS. 4, 5 and 7, when not is use. Back box 17 is attached to the back portion of the open frame 6 and has compartments 18 and 20. Slide openings 21 in the sides of the back box 17 slideably receive pivots 22 attached to the handle 4 which allow the handle 4 to be placed in an upright position, as shown in FIG. 4. Cabinet latches (not shown) hold the wings 11 in a closed position and the handle 4 in an upright position, all as shown in FIG. 4. Springs (not shown) in the slide openings 21 hold the handle 4 in the down position, as shown in FIGS. 1 and 3.

In use, the lawn and garden cart is removed from the storage place in the folded position shown in FIG. 4. Handle 4 is moved to the down position as shown in FIGS. 1 and 3. Seeds may be stored in compartment 20 and small handled tools may be stored in compartments 18. Long handled tools are stored in the tubes 8. Other objects and fertilizer bags may be stored in the bottom storage box 1. The cart may be tilted to a balanced position on wheels 2 and wheeled to the lawn or garden for use. Wings 11 are then opened and legs 12 adjusted to fit the terrain so that the cart may be used in an essentially horizontal position. Trash bag bracket 16 is then raised to a horizontal position and placed in the brackets 15 attached to the wings 11. This then fixes the wings 11 in a secure position so as to give the cart a 4 point base on the ground, the 4 points being the two wheels 2 and the two adjustable legs 12. The trash bag bracket 16 will hold a trash bag 16A by looping it over the curved portion of the trash bag bracket 16 and the back portion 16B of the trash bag bracket 16. The trash bag 16A may be affixed to the trash bag bracket 16 by a clamping means, such as a clothes-pin 23.

When thus in use, the lawn and garden cart can be readily available for providing short handled tools, long handled tools and seeds. Small bags of fertilizer, peat moss and other similar items used around the lawn and garden may be stored and transported in the bottom storage box 1 by placing them through openings 3. When in a folded position, the lawn and garden cart is relatively small and can be stored in a relatively small area. The storage area needed will only be about the size of the bottom storage box 1. The mounting of the trash bag bracket 16 on the wings 11 will make it possible to carry most any weight in the trash bag 16A attached to the trash bag bracket 16.

I claim:

1. A manually propelled lawn and garden cart comprised of a bottom storage box having oblique openings on either side near the top of the bottom storage box, an open frame secured to the top of the bottom storage box, a cross piece attached to the top of the open frame, holes in the cross piece and in the top of the bottom storage box connected by tubes, wheels attached to the bottom storage box, a pivotable handle attached to the bottom storage box near the wheels, wings pivotably attached between extensions of the bottom storage box and extensions of the open frame, a trash bag bracket pivotably attached to the open frame near its top, brackets attached to the wings that will receive the trash bag bracket when the wings are in an open position and the trash bag bracket is moved to a horizontal position.

2. The manually propelled lawn and garden cart of claim 1, a block attached to the bottom of each wing, adjustable legs having openings therein which are slideable on the blocks and which may be fastened in place by means of wing nuts and washers.

3. The manually propelled lawn and garden cart of claim 2, a back box attached to the open frame, slide openings in the sides of the back box, pivots attached to the handle which slideably engage the slide openings.

* * * * *